(12) United States Patent
Ligouri et al.

(10) Patent No.: US 11,967,104 B1
(45) Date of Patent: Apr. 23, 2024

(54) METHOD FOR DETERMINING THE ACTUAL LOCATION OF AN OBJECT IN A CAMERA FIELD OF VIEW

(71) Applicant: Government of the United States, as represented by the Secretary of the Air Force, Wright-Patterson AFB, OH (US)

(72) Inventors: Anthony Ligouri, Bellbrook, OH (US); Hayk Azatyan, Springfield, OH (US); William Erwin, Oakwood, OH (US); Travis Rennich, Oakwood, OH (US); David Shald, Dayton, OH (US); Adam Warren, Fairborn, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 213 days.

(21) Appl. No.: 17/536,176

(22) Filed: Nov. 29, 2021

Related U.S. Application Data

(60) Provisional application No. 63/129,953, filed on Dec. 23, 2020.

(51) Int. Cl.
 *G06T 7/73* (2017.01)
 *G06V 20/17* (2022.01)
 *H04N 7/18* (2006.01)

(52) U.S. Cl.
 CPC .............. *G06T 7/73* (2017.01); *G06V 20/17* (2022.01); *H04N 7/183* (2013.01)

(58) Field of Classification Search
 CPC ........... G06T 7/73; H04N 7/183; G06V 20/17
 See application file for complete search history.

(56) References Cited

U.S. PATENT DOCUMENTS 7,798,090 B2 9/2010 Hatfield
8,749,635 B2 6/2014 Hogasten et al.
(Continued)

FOREIGN PATENT DOCUMENTS

WO 20190055862 A1 5/2019

OTHER PUBLICATIONS

Koretsky, G.M., et al., A Tutorial on Electro-Optical/Infrared (EQIR) Theory and Systems, Institute for Defense Analyses (IDA), Alexandria, VA, U.S.A., Jan. 2013, published on the internet at https://www.ida.org/-/media/feature/publications/a/at/a-tutorial-on-e-lectro--opticalinfrared-eoir-theory-and-systems/ida-document-d-4642.ashx.

(Continued)

*Primary Examiner* — Kathleen V Nguyen
(74) *Attorney, Agent, or Firm* — AFMCLO/JAZ; Jeffrey V. Bamber

(57) ABSTRACT

A method of determining the location of an object in a camera field of view is disclosed. The method may utilize a camera system that includes a digital video camera and a computer that runs image analysis software for analyzing images received from the camera. The image analysis software is configured to isolate pixel groups in each image. The method includes the steps of locating an object in the camera's field of view in which the object is represented by a set of pixels; identifying the centroid of the set of pixels representing the object; and calculating the location of the object relative to the camera based upon known parameters including the focal plane and camera lens location.

13 Claims, 6 Drawing Sheets
(2 of 6 Drawing Sheet(s) Filed in Color)

(56) References Cited

U.S. PATENT DOCUMENTS

| | | | |
|---|---|---|---|
| 10,089,751 B1* | 10/2018 | Ter Beest, III | H04N 7/181 |
| 10,896,327 B1* | 1/2021 | Lablans | G06V 10/25 |
| 2009/0041302 A1* | 2/2009 | Nagaoka | G06V 40/103 |
| | | | 382/103 |
| 2012/0170024 A1 | 7/2012 | Azzazy et al. | |
| 2019/0130737 A1* | 5/2019 | Ellis | G08G 1/04 |
| 2019/0387171 A1* | 12/2019 | Juang | H04N 23/63 |
| 2021/0331695 A1* | 10/2021 | Ramakrishnan | G06N 3/08 |

OTHER PUBLICATIONS

Fulton, Wayne, Calculate Distance or Size of an Object in a Photo Image, www.scantips.com, published on the Internet at www.scantips.com/lights/subjectdistance.html, 2015-2021.

* cited by examiner

METHOD FOR DETERMINING THE ACTUAL LOCATION OF AN OBJECT IN A CAMERA FIELD OF VIEW

Pursuant to 37 C.F.R. § 1.78(a)(4), this application claims the benefit of and priority to prior filed Provisional Application Ser. No. 63/129,953 filed Dec. 23, 2020, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to systems and methods for determining the location of persons or objects and, more particularly, to determining the location of persons or objects in a camera field of view.

BACKGROUND OF THE INVENTION

A person may become isolated (isolated person or "IP") on a large body of water or in other vast areas and need to be rescued. Prior methods include human rescuers searching for isolated persons in a vast ocean from an aircraft that is often flying thousands of feet in the air. Human or visual searching for an object (e.g., lost person at sea) is often ineffective due to the difficulty in isolating such a small object in a vast area. Human fatigue and eye fatigue make this a relatively ineffective method to quickly pinpoint an isolated person. Given the time factor involved in survival of an isolated person, any delays should be minimized by using technology that is more capable of identifying an isolated person in a vast environment.

The search for improved systems for searching for and finding persons or objects has continued. In particular, a need exists for automated systems for searching for and finding isolated persons or objects.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

The present invention can be used in conjunction with an automated search and identification system that can locate persons or objects in difficult search environments. The automated search system can be used in search/rescue operations to find isolated persons or objects in an ocean or other vast environments where visual searching and/or human fatigue can often miss the intended person or object.

In some embodiments, an automated camera system is provided that is configured to search for an object emitting or reflecting a certain wavelength of light. The camera system comprises a digital video camera that is configured to capture images of objects emitting or reflecting a certain range of wavelengths of light. The camera can be infrared, electro-optical, or hyper spectral (a combination of different cameras that is able to detect objects emitting multiple bands of wavelengths of light). Image processing software is configured to isolate pixel groups in each image, wherein those pixel groups fit a wavelength or color patterns of an object being searched. The system may also include processing methods for determining the relative location of the object (GPS or otherwise) based upon the location of the camera and the field of view of the camera. Materials can be used to tag the object so that the object is easier to find in adverse lighting conditions. In some cases, the tag can be a wavelength that only one group of searchers knows about, and hence the object can remain relatively hidden from others. The system can be readily mounted in an aircraft or other vehicle so that large areas can be scanned and searched.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to systems and methods for searching for and finding persons or objects and, more particularly, to automated systems for searching for and finding persons or objects. Systems and methods for determining the location of persons or objects in a camera field of view are also provided.

Figure 1:
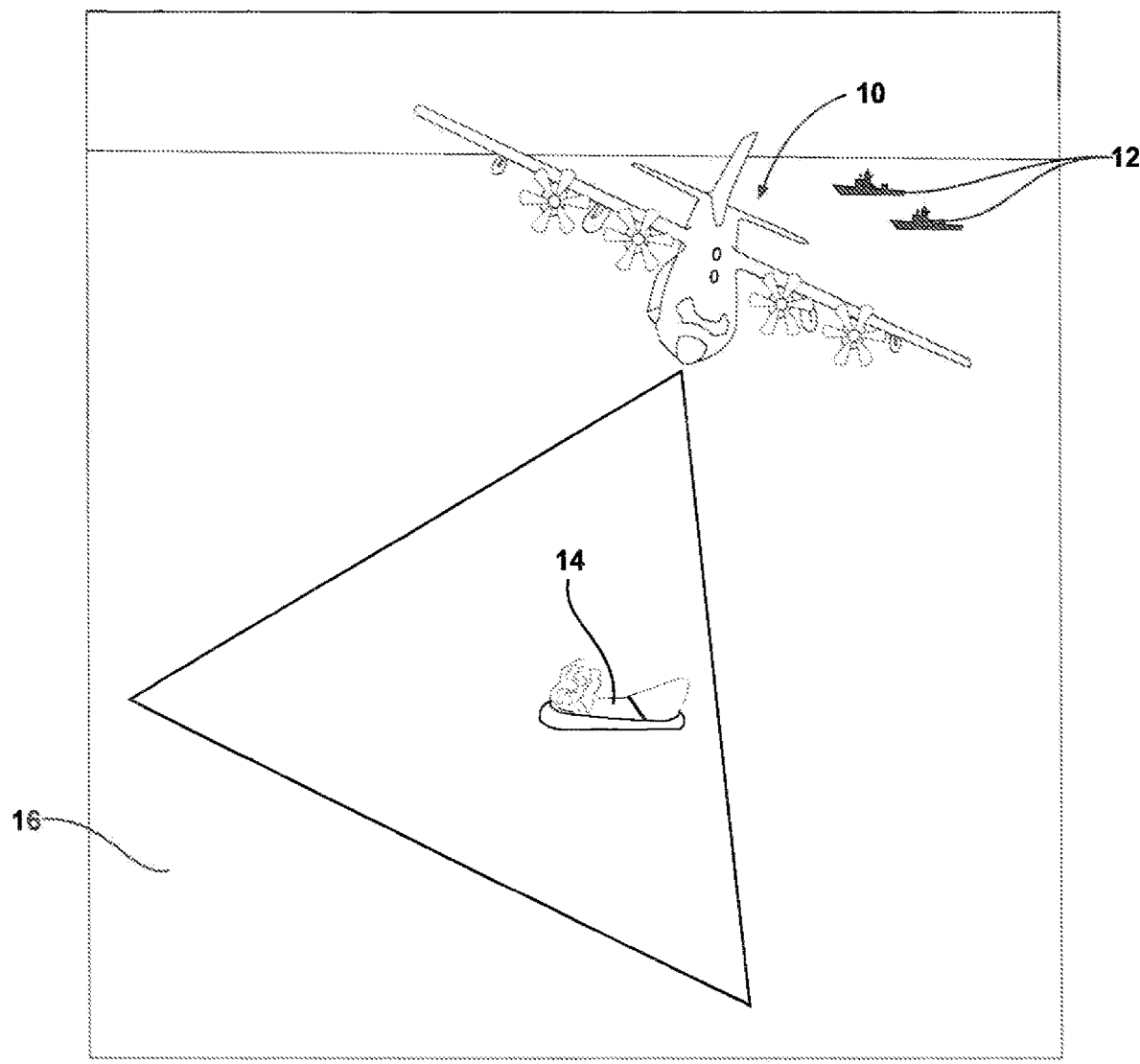
FIG. 1 is a perspective view of an aircraft searching for an isolated person on a body of water.
Figures 2, 2A:
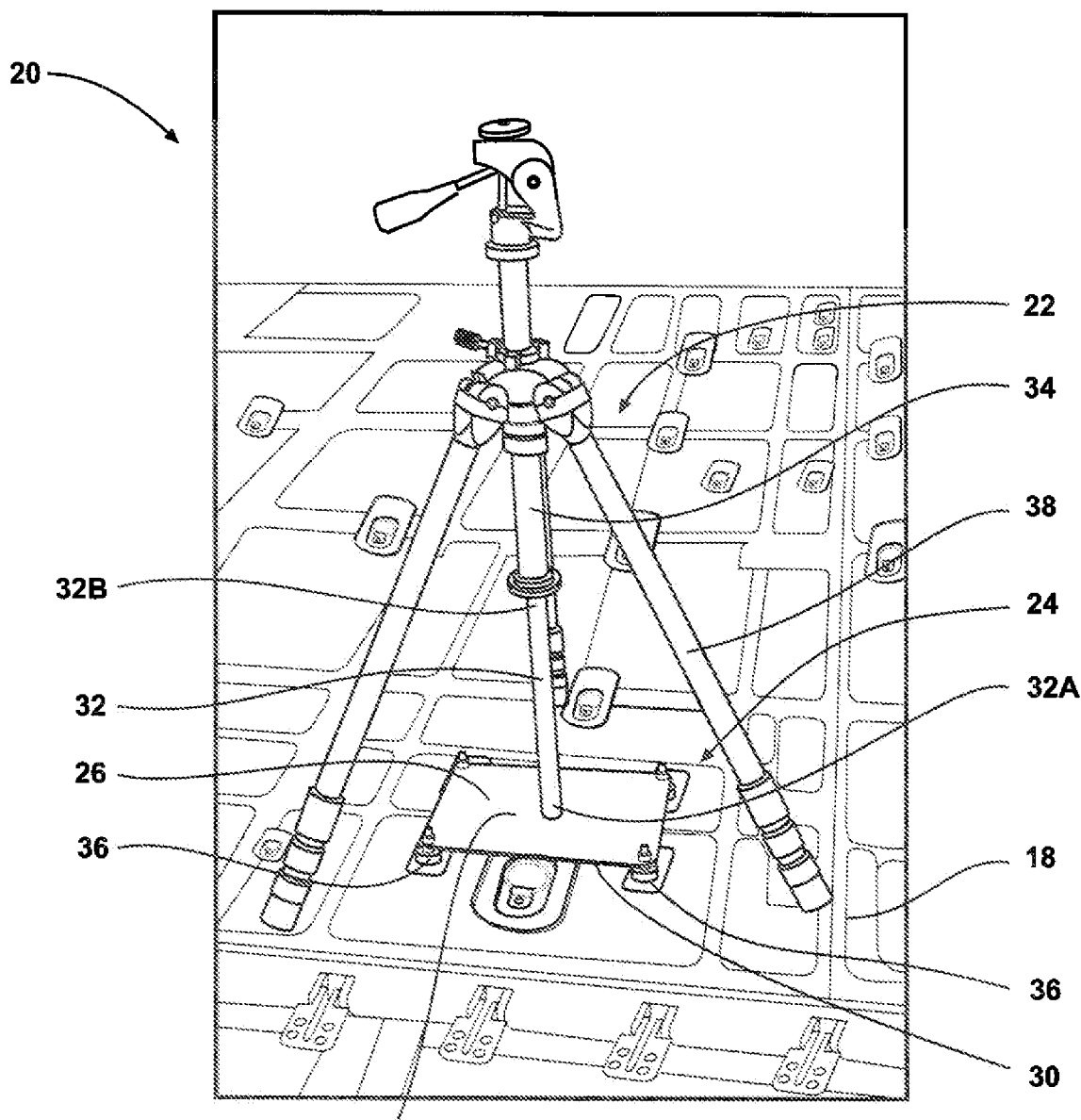
FIG. 2 is a perspective view of an EO/IR/hyperspectral camera on a tripod mounted on the cargo ramp of a military aircraft.
FIG. 2A is a perspective view of one embodiment of a quick-detachable cleat that is used to join the tripod to the cargo ramp.

FIG. 1 shows an aircraft 10 and ships 12 searching for an isolated person 14 on a body of water 16. FIG. 2 shows one non-limiting embodiment of a self-contained system comprised of components that may be used to search for and locate an IP or object in a vast and/or adverse environment. The term "object" may be used generically herein to include both persons and material things (that can be seen and touched) other than persons. The system comprises an automated camera system that is configured to search for an object emitting or reflecting a certain wavelength of light.

The system comprises a digital video camera 20 that is capable of capturing video images. The camera is mounted on a tripod 22. The camera is configured to capture images of objects emitting or reflecting a certain range of wavelengths of light. While a variety of wavelengths might be used, the representative embodiment uses a camera selected from the group comprising Electro-Optical (EO), Infra-Red (IR), and hyperspectral cameras. Hyperspectral cameras are those that can simultaneously capture images in multiple wavelengths. EO/IR/hyperspectral cameras can assist in detecting objects by delineating higher contrasts between the object and background, and by applying higher specificity to any particular wavelength. Therefore, with EO/IR/hyperspectral cameras the object can be made to stand out more clearly from its surrounding background.

Infrared (IR) light is similar to visible light in that photons are reflected or absorbed by an object, but provides a stronger contrast with the environment needed for high resolution imaging. A large number of applications that are difficult or impossible to perform using visible light are possible using IR. When imaging in some IR wavelengths, water vapor, fog, and certain materials such as silicon are transparent. Additionally, colors that appear almost identical in the visible spectrum can more easily be differentiated using IR. The IR spectrum ranges from near IR (N-IR) to long wave IR (LWIR) (or Far infrared) and includes the MWIR band. The wavelengths in the IR spectrum range between 0.75 and 1,000 micrometers.

The camera may be capable of recording digital images, although it is not necessary that the camera continuously record images other than those that are relevant to searching for the person or object in issue. The camera comprises firmware which is the operating system of the camera. The camera takes the images and the firmware can lighten, darken, or otherwise manipulate the image.

The camera system further comprises a computer in electronic communication with the camera. The computer is conventional and is not shown. The camera feeds images to the computer, and the computer runs image analysis software for analyzing images received from the camera. The computer may run image analysis software to analyze the images received from the camera in real time, or after a period of time. The images will typically be analyzed in real time in a search and rescue operation. The image analysis software is configured to isolate pixel groups in each image when those pixel groups fit a wavelength or color patterns of an object being searched.

Figure 3A:
FIG. 3A shows a first step in processing an image according to the method described herein.
Figure 3B:
FIG. 3B shows a second step in processing an image according to the method described herein.
Figure 3C:
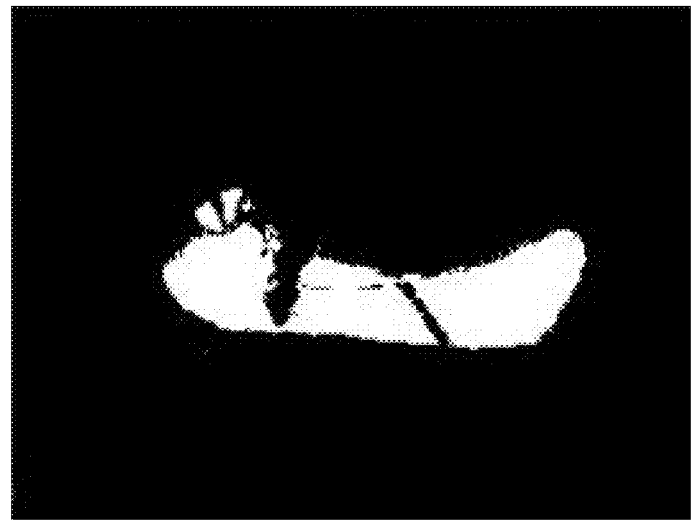
FIG. 3C shows a third step in processing an image according to the method described herein.
Figure 3D:
FIG. 3D shows a fourth step in processing an image according to the method described herein.
Figure 3E:
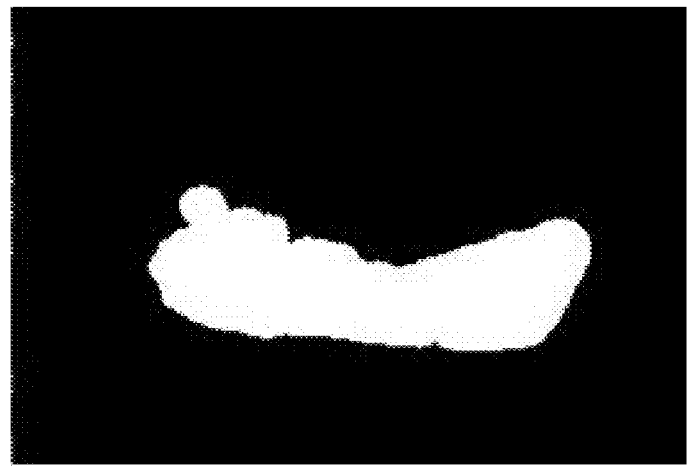
FIG. 3E shows a fifth step in processing an image according to the method described herein.

FIGS. 3A to 3F show a series of processing steps that are applied to the images provided by the EO/IR/hyperspectral camera in order to maximize the chance of identification of a target object. First the original image (shown in FIG. 3A) is converted into an HSV (Hue, Saturation, Value) color space (shown in FIG. 3B), and also into an RGB (Red, Green, Blue) color space (shown in FIG. 3C). The color (or wavelength) of an intended object (orange for instance) is isolated in both color space versions. FIG. 3D shows color (or wavelength) of an intended object (orange for instance) isolated in the RGB color space. FIG. 3E shows color (or wavelength) of an intended object (orange for instance) isolated in the HSV color space. The two results (HSV+ RGB) are combined into a single mask (shown in FIG. 3E).

Figure 3F:
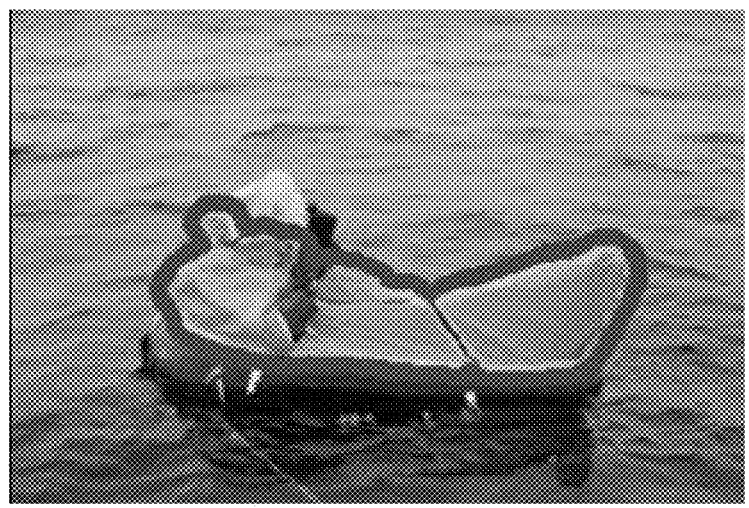
FIG. 3F shows a sixth step in processing an image according to the method described herein.

The camera system can additionally be configured to superimpose a highlighting marker (or boundary, or other type of visual identifier) around the identified object or centroid pixel mass. FIG. 3F, for example, shows the edge of the combined mask stroked in red and overlaid over the original image. This will assist an operator or observer that is using the camera (or cameras) to quickly identify the possible existence of a target object. Application of this combined mask has been found to provide a very clear contrast of the target object against the background.

In the electromagnetic spectrum, a target object will consist of a set of pixels that are emitting/reflecting the particular wavelength being searched for by the search party. For example, if there is no light, there will be a black or gray background. The image can be black, white, and in between is gray scale. The camera may, for example, be looking for a bright white spot in a black or gray background (such as that of the ocean). The image analysis software is also configured to identify objects in images received from the camera, where the objects have a pre-selected pixel mass size. The processing steps above can then be used by replacing the (example) orange target color with a pixel intensity threshold in the desired spectrum, wherein a sufficiently large pixel mass will trigger the threshold. The automated system can provide an audible or visual signal to alert persons conducting the search of the threshold being triggered. Any object that triggers the threshold will then be investigated further as it may likely be the target object (or person) that is being searched for by the rescue team. The method is also able to identify the centroid of the identified pixel mass of the target object, which will be used in computing the location of the object.

To further enhance the chances of finding a target object, the object can be previously provided (that is, before the search) with one or more tags that reflect or light sources that emit light in specific wavelengths that the system can be programmed or "tuned" to look for specifically. In practice, IR-emitting sources need to be within the desired band for ideal performance of the system. For non-emitting targets, some type of additional illuminating tag may be needed.

Such tagging materials can be any material that emits IR radiation in the sensitivity range of the camera. Such tagging materials and light sources include, but are not limited to: a light or electric beacon; various chemicals and rare earth minerals that absorb UV light and fluoresce IR radiation; materials that can create a chemo luminescent reaction (e.g., a glow stick); materials that use the reflection of IR light from the sun, or other source. The tagging material and/or light source can be provided in any suitable form. The tagging material can be provided on an object. In the case of a person, the tagging material can be provided on their clothing or on something in their possession. In some cases, the tagging material can be embedded in a flexible, transparent polymer sheet. Such sheets could be used to create camouflage (for water or land), or could be provided in the form of a waterproof shroud for a raft that could keep the IP dry and concealed from enemy eyes.

FIG. 2 shows a special tripod mount 24 for the camera is also provided. The tripod mount 24 can be readily joined to the decking plates 18 of an aircraft, such as a C-130 or other type of search platform (i.e. air, land, or sea vehicle). The tripod mount 24 comprises a base (or base plate) 26 having two surfaces, which comprise an upper surface 28 and a lower surface 30 when the tripod mount is mounted in the desired location. A rod 32 is joined to the upper surface 28 of the base 26 and extends generally perpendicular thereto. The rod 32 has a proximal end 32A joined to the upper surface of the base and a distal end 32B. The distal end 32B of the rod is configured for joining to the extendible neck 34 of a tripod 22. A plurality (e.g., four) connecting feet (or quick-detachable cleats) 36 are joined to the lower surface of the base 28 in a spaced apart configuration. Suitable detachable cleats as shown in FIG. 2A include 12-Jaw Seat/Cargo Tie Down Quick Disconnect Adapters (MS22034 style) Part no. 33116, available from Kinedyne LLC of Prattville, AL, U.S.A. The tripod mount 24 is able to anchor a consumer off-the-shelf (COTS) tripod to the cargo ramp. In the embodiment shown, a tripod manufactured by Slik of Huntington Beach, CA, U.S.A. with an extendible neck is used. Extending the neck 34 of the tripod 22 loads the legs 38 by tensioning the tripod mount and/or the legs of the tripod, which results in a very sturdy platform for the lightweight EO/IR/hyperspectral camera. All the other hardware can be safely stored and used further inside the aircraft.

The mounting system (or mount) 24 is designed for rapid transition between vehicles. The vehicle can also be an aircraft, a watercraft or a land vehicle. The vehicle may be moving or stationary. The camera can be mounted anywhere, including the fuselage on an aircraft, or on the outer surface of other types of vehicles. However, mounting the system on the fuselage of an aircraft requires a lengthy airworthiness certification process. Accordingly, the representative embodiment herein chooses to mount the camera (and tripod) to the ramp of a C-130 aircraft where it is considered no different than any other piece of gear that is brought into the airplane.

Human searchers usually sit on the ramp when searching for an IP, and they can generally only pay attention to one area at a time while they are searching. The present method can use several EO/IR/hyperspectral cameras mounted on the ramp at different angles. The cameras can all comprise the same type of camera (e.g., EO, IR, or hyperspectral). Alternatively, different combinations of EO, IR, and hyperspectral cameras can be used. A single attending airman can then monitor 360 degrees around the aircraft, ranging out to many hundred yards, with near constant vigilance. The cameras may be fixed in the direction in which they are pointed. In other embodiments, one or more of the cameras may have a motorized mount so that the camera is can scan different directions of the field of search.

To further aid in the search/rescue effort, a method for determining the location of the target object in relation to the search/rescue vehicle and camera is provided. In a search and rescue operation, a search vehicle such as an airplane might identify an object/person from many miles away and from a high altitude. The GPS location of the search vehicle (e.g., airplane) will be known. The method is able to calculate the range and bearing of the target object from the camera that is mounted onboard the search vehicle (e.g., airplane), based upon known camera parameters (i.e. focal plane and camera lens location) and geometric calculations. Focal length is the distance from the lens' optical center to the image plane. The optical center is dependent on the lens geometry and is a common term used in optics. The focal plane will typically be represented by a mark that appears on most camera bodies.

Figure 4:
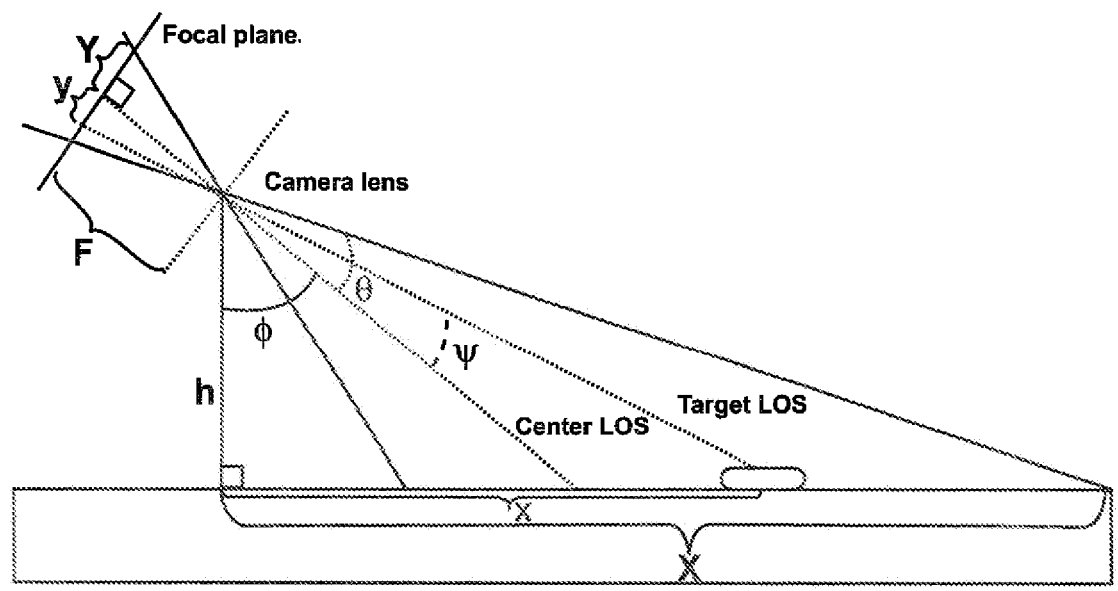
FIG. 4 is a diagram showing a method of determining the horizontal distance to a target object in a camera's field of view.
Figure 5:
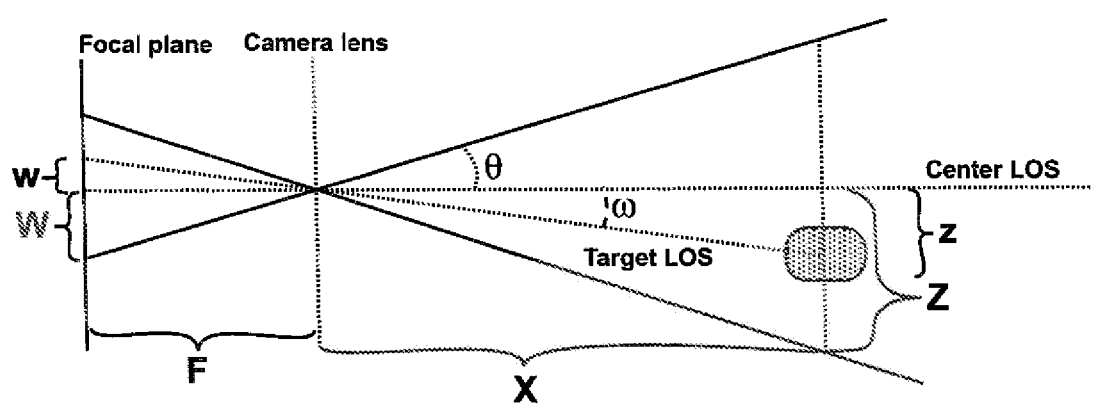
FIG. 5 is a diagram showing a method of determining the lateral distance to a target object in a camera's field of view.

The method of finding the range and bearing of the target object from the camera is shown in FIGS. 4 and 5. The actual location of the object can be determined by use of geometric relationships between where the object appears in the camera's field of view and where the search platform (i.e., moving or stationary) is located in space and time. The algorithm may be run on the computer to which the camera is feeding the imagery. The camera only serves to collect the images, and all image analysis and coordinate calculations are performed on the computer.

The first calculation is to find the distance x (shown in FIG. 4), which is the horizontal distance between the searching camera and the target object. When calculating the location of the target object, this is based on the location of a single pixel (the centroid of the identified pixel mass of the target object). The distance x can be derived from:

(1) h, which is the height of the camera lens above the object plane or horizon. In a rescue aircraft, this would be the known altitude of the airplane.

(2) y, which is the distance between the endpoint of the center Line of Sight (LOS) and the target LOS on the focal plane. If an image is considered to comprise a cone of light coming into a lens, the center Line of Sight is the line along the center axis of the cone, i.e., a line to the center of the image. The maximum LOS is the line along the outer surface of the cone at the top center of the image. It is the maximum distance you can see in the image. The target LOS is the line to the target in the image and is somewhere within the cone or on its surface. The distance y is determined by counting pixels from the target pixel to the center of the image and multiplying by the pixel pitch (physical distance between pixel centers).

(3) F, which is the distance between the focal plane and the lens on the camera system. This distance between the camera focal plan and the lens will be known or derived from the particular camera setup.

(4) Theta ($\theta$), which is the angle between the center LOS and the maximum LOS.

The following formula will provide the previously unknown distance x:

$$x = h * \tan(\tan^{-1}(y/F) + \theta).$$

The second calculation is to find distance z (shown in FIG. 5), which is the lateral distance of the target object from the center LOS of the camera system. The distance z can be derived from:

(1) x, as derived above.

(2) w, which is the distance between the endpoint of the center LOS and the endpoint of the target LOS on the focal plane. The length w is calculated the same way as y, but in the horizontal direction. W and Z are the maximum distances subtended by the field of view. They are useful for showing the theory in diagram but are not needed in the calculation. If the target is on the edge of the image, then z=Z and w=W.

(3) F, which is the distance between the focal plane and the lens.

The following formula will provide the previously unknown distance z:

$$z = x*\tan(\tan^{-1}(w/F)).$$

Together x and z can be used to find the range using the following formula:

$$\text{range} = \text{square root of } (x^2 + z^2)$$

The bearing ω, is the angle from the center LOS to the target LOS.

A final coordinate transformation can be applied to the derived range and bearing to determine the GPS location of the target object. The target requires no markers or tags that indicate its GPS coordinate position. The GPS location of the aircraft is known, and the algorithm takes the range and bearing to the target and translates this to the GPS location of the target. The method described herein does not require the use of laser, radar, or acoustic distance measuring means to the target. This GPS location can be used to more quickly rescue the person.

The present invention is made and used as follows. The present system utilizes a commercially-available EO/IR/hyperspectral camera in combination with novel software and analysis techniques described herein to create an automated device to search for objects that emit a particular wavelength. When completely configured, the system is self-contained (other than needing power).

This type of system can be used by search and rescue teams across all branches of the military, including water and land-based search operations. Other rescue and/or first responder organizations can also benefit from the technology, including but not limited to firefighters, park services, law enforcement, and lifeguards. Safety and rescue groups could use the system to improve search and rescue operations, particularly under adverse conditions.

Various alternative embodiments of the system described herein are possible. The systems and methods described herein are not limited to use in search and rescue operations. The system can be configured to detect any type of object (or person) in an automated manner, particularly if the object is known to be a certain color or will emit a certain wavelength. Commercial interest in this type of invention could be far ranging, including but not limited to machine vision setups, manufacturing situations, security and crowd monitoring, animal control and monitoring. Hence, various examples, include but are not limited to: (1) vision systems to identify particular objects; (2) manufacturing situations to find a certain part (among many other parts) such as in the production of products; (3) searching a crowd of people for one particular color or wavelength that might be emitted by a person (or persons); and (4) searching a herd of animals for one particular animal, whether it be wildlife conservation efforts, or even controlled farming/herding efforts.

The concept of purposefully tagging an object (or person) to make them easier to locate can be applied to many different situations. For instance, lifeguard stations could be equipped with such a system. Swimmers could wear clothing or a tag material that emits an easy-to-find wavelength, and therefore makes the swimmer easier to find in an adverse situation. Similarly, hikers in wilderness areas could wear such special tags in order to make a search and rescue (SAR) operation more effective and efficient (should they get lost).

In addition, it should be understood that the order of at least some of the steps of the methods described herein may be varied and the methods will still accomplish the desired purpose. The steps that can be varied in order include, but are not limited to those of converting an image into an HSV color space and a RGV color space and isolating the object in both color space versions. For example, the image can be converted into an HSV color space before or after it is converted into an RGV color space version. Any other changes in the order of steps that produces the same results is also contemplated.

The automated camera/search system 20 described herein can provide a number of advantages. It should be understood, however, that these advantages need not be required unless they are set forth in the appended claims. The disclosed invention provides a faster and more effective system for locating an isolated person or object in a vast and/or adverse environment. The invention employs novel use of an EO/IR/hyperspectral camera along with novel image processing techniques that can quickly provide the relative location (i.e., GPS coordinates) of an IP in relation to the camera and/or searching platform. The automated system can tirelessly scan and process information about the area being viewed, and can also look for certain identifying wavelengths that might be emitted from the object.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of determining the location of an object in a camera field of view, wherein said camera is located on a platform, said method comprising the steps of:

using a camera having a lens to bring an object located on an object plane into focus with said camera, said camera having a focal plane, wherein the distance between the camera focal plane and the lens is designated F;

determining, h, the height of the camera lens above the object plane;

determining the center Line of Sight, the target Line of Sight, and the maximum Line of Sight;

determining y, the distance between the endpoint of the center Line of Sight and the target Line of Sight on the focal plane;

determining the angle, θ, between the center Line of Sight and the maximum Line of Sight;

calculating x, wherein:

$$x = h*\tan(\tan^{-1}(y/F) + \theta);$$

determining w, the distance between the endpoint of the center Line of Sight and the endpoint of the target Line of Sight on the focal plane;

calculating z, wherein:

$$z = x * \tan(\tan^{-1}(w/F));$$

calculating the range:

$$\text{range} = \text{square root of } (x^2 + z^2)$$

calculating the bearing ω, which is the angle from the center Line of Sight to the target Line of Sight.

2. The method of claim 1 wherein the platform for the camera is on an airplane flying above a body of water, and the object is on the body of water.

3. The method of claim 2 further comprising obtaining the GPS coordinates of the camera platform, and translating the calculated location of the target object into GPS coordinates.

4. The method of claim 1 wherein said camera is capable of capturing video images.

5. The method of claim 2 wherein said camera is capable of capturing video images.

6. The method of claim 1 wherein said camera is selected from the group consisting of infrared, electro-optical, and hyperspectral cameras.

7. The method of claim 2 wherein said camera is selected from the group consisting of infrared, electro-optical, and hyperspectral cameras.

8. The method of claim 1 wherein said camera is configured to capture images of objects emitting or reflecting a certain range of wavelengths of light.

9. The method of claim 2 wherein said camera is configured to capture images of objects emitting or reflecting a certain range of wavelengths of light.

10. The method of claim 8 wherein the object is reflecting or emitting light of said range of wavelengths.

11. The method of claim 9 wherein the object is reflecting or emitting light of said range of wavelengths.

12. The method of claim 10 wherein the object is tagged with a material that reflects or emits light of said range of wavelengths.

13. The method of claim 11 wherein the object is tagged with a material that reflects or emits light of said range of wavelengths.

* * * * *